United States Patent
Feineis et al.

(10) Patent No.: US 10,800,299 B2
(45) Date of Patent: Oct. 13, 2020

(54) ARMREST FOR AN INTERIOR FITTING PART OF A MOTOR VEHICLE

(71) Applicant: Lisa Draexlmaier GmbH, Vilsbiburg (DE)

(72) Inventors: Martin Feineis, Landshut (DE); Jörg Lippmann, Munich (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 16/599,140

(22) Filed: Oct. 11, 2019

(65) Prior Publication Data

US 2020/0039400 A1    Feb. 6, 2020

Related U.S. Application Data

(63) Continuation of application No. PCT/DE2018/200027, filed on Mar. 12, 2018.

(30) Foreign Application Priority Data

Apr. 12, 2017   (DE) ................. 10 2017 107 971

(51) Int. Cl.
| | |
|---|---|
| *B60N 2/56* | (2006.01) |
| *B60N 2/75* | (2018.01) |
| *H05B 1/02* | (2006.01) |

(52) U.S. Cl.
CPC ............. *B60N 2/5685* (2013.01); *B60N 2/79* (2018.02); *H05B 1/0238* (2013.01)

(58) Field of Classification Search
CPC ........ B60N 2/5685; B60N 2/79; B60N 2/002; H05B 1/0238

USPC .......................................... 219/202, 209, 217
See application file for complete search history.

(56) References Cited

U.S. PATENT DOCUMENTS

| | | | | |
|---|---|---|---|---|
| 2012/0306512 | A1* | 12/2012 | Kandler ................. | B60N 2/002 324/686 |
| 2014/0339211 | A1* | 11/2014 | Barfuss ................. | B60N 2/002 219/202 |

FOREIGN PATENT DOCUMENTS

| | | |
|---|---|---|
| DE | 20314083 | 1/2004 |
| DE | 102006011654 | * 9/2007 |
| DE | 102012021887 | 5/2014 |
| DE | 102013010410 | 12/2014 |

(Continued)

OTHER PUBLICATIONS

International Search Report for International Application PCT/DE2018/200027, dated Jun. 18, 2018.

*Primary Examiner* — Dana Ross
*Assistant Examiner* — Joseph W Iskra
(74) *Attorney, Agent, or Firm* — Burris Law, PLLC

(57) ABSTRACT

An armrest for an interior equipment part of a motor vehicle includes a decor layer, a support element, a cushion element disposed at least in sections between the support element and the decor layer, and a heating element disposed at least in sections on the decor layer. Furthermore, the armrest includes a sensor element that includes an electrode and a counter electrode. The sensor element is electrically connected to a control unit, wherein the sensor element is designed to send an electric sensor signal to the control unit when the distance between the electrode and the counter electrode changes at least in regions, and the control unit is designed to switch the heating element off and/or on as a function of the sensor signal.

13 Claims, 2 Drawing Sheets

(56) References Cited

FOREIGN PATENT DOCUMENTS

EP    2233046    9/2010

* cited by examiner

ARMREST FOR AN INTERIOR FITTING PART OF A MOTOR VEHICLE

CROSS-REFERENCE TO RELATED APPLICATIONS

This application is a continuation of International Application No. PCT/DE2018/200027, filed on Mar. 12, 2018, which claims priority to and the benefit of DE 10 2017 107 971.8 filed on Apr. 12, 2017. The disclosures of the above applications are incorporated herein by reference.

FIELD

The present disclosure relates to an armrest for an interior equipment part of a motor vehicle, which features a heating element, so that the armrest can be heated.

BACKGROUND

The statements in this section merely provide background information related to the present disclosure and may not constitute prior art.

Armrests are used in many ways, especially in passenger vehicles. For example, armrests are located in the center console or in the door panel. Armrests are frequently heated, especially in the upper price segment of passenger vehicles. Due to the integration of a heater it is possible to adjust the temperature of the armrest surface so that a particularly pleasant contact surface can be created for a vehicle passenger.

A heated armrest of this kind is disclosed, for example, in DE 101 59 814 B4. The armrest consists of a support element onto which a foam layer is disposed. A heating element is arranged in the foam layer between the visible side of the interior equipment part and the support element so that the heating element is covered by the foam layer on the visible side.

However, the disadvantage of heated armrests is that the heating element has to be switched on and off by means of additional switching elements. Thus, if a passenger switches the heating on and forgets to switch it off later, then energy to heat the armrest is consumed permanently, but without the vehicle passenger actually using the armrest. In addition, another disadvantage is that additional switching and control elements have to be provided in order to switch the armrest heating on and off.

SUMMARY

The present disclosure provides an armrest in which the integrated heating element can be intuitively controlled.

An armrest according to the present disclosure for an interior equipment part of a motor vehicle comprises a decor layer, a support element, and a cushion element. The decor layer can be designed, for example, from leather, a textile, a leather-like material, or a synthetic material, forming the visible surface of the armrest in an interior space of the motor vehicle in the installed state. But in contrast, the support element forms a torsion-resistant structure which can absorb and divert forces. For example, the support element can be part of an interior equipment part, e.g. of a door panel or of a covering unit which is suitable for covering a storage compartment. The cushion element is arranged at least in sections between the support element and decor layer and is used for cushioning of the armrest.

The cushion element can be formed, for example, by a foam body or by a textile. Likewise, the cushion element can be formed by a fluid cushion.

Furthermore, a heating element is arranged, at least in sections, on the decor layer. Depending on how the heating element is designed, the heating element can be arranged both on a side of the decor layer facing, or also facing away from the cushion element. Furthermore, the armrest comprises a sensor element that comprises an electrode and a counter electrode, wherein the sensor element is electrically connected to a control unit. The electrode is arranged in an overlapping manner, at least in sections, on one of the sides of the cushion element facing the decor layer at a distance to the counter electrode arranged in the region of the support element. It should be mentioned at this point that the electrode need not be affixed to the cushion element. Likewise, it is possible that the electrode is indeed arranged on the side of the cushion element facing the decor layer but affixed to the decor layer and not to the cushion element. Both the electrode and also the counter electrode extend in one form in an area parallel to the heating element.

According to the present disclosure, the sensor element is designed to send an electric sensor signal to the control unit when the distance between electrode and counter electrode changes at least in some regions. In this regard, the sensor signal can be sent both when the distance between electrode and counter electrode decreases and also increases. The term "distance" in this connection can mean the shortest distance between the electrode and the counter electrode, especially in the region where the electrode and counter electrode are arranged overlapping each other.

The distance of the electrode from the counter electrode can be variable, for example, in that a cushion element with elastic restoring behavior is selected, so that initially a reduction in distance between electrode and counter electrode occurs as soon as a vehicle passenger rests against the armrest, and thus the cushion element is compressed by the applied force. The distance can then be increased again merely when no more force is applied onto the cushion element, for example, because the vehicle passenger is no longer resting upon the cushion and the cushion element returns to its original shape due to its restoring property.

However, the control unit is designed so as to switch the heating element on or off as a function of the sensor signal. For example, if a sensor signal is transmitted from the sensor element to the control unit to indicate that the distance of the electrode to the counter electrode is reduced, because for example a vehicle passenger has placed an arm upon the armrest, the control unit can then subsequently switch on the heating element. But if the distance from the electrode to the counter electrode increases because the vehicle passenger has removed the arm from the armrest, then due to the corresponding sensor signal the control unit can switch off the heating element so that the armrest will no longer be heated.

The control unit can also be designed to take into account only changes in distance between the electrode and the counter electrode which exceed a particular value or a defined threshold value, so that a mere relief of the pressure of an arm resting upon the armrest will not cause a complete switch-off of the heating element. Rather, the switch-off of the heating element can only occur after the distance between the electrode and the counter electrode is similar to or identical to the distance when the armrest is unstressed.

Due to the use of the sensor element, which is connected to the control unit, an additional switching apparatus to switch the heating element on and off is not necessary.

Rather, the mere placement or removal of an arm of the passenger upon the armrest can trigger the control of the heating element, for example.

It can be an advantage that the electrode is formed by the heating element itself. In this case, it is an advantage that the heating element is formed from one or a plurality of electric circuit path(s) that together form a surface. In particular, if the change in the distance between the electrode and the counter electrode is determined in that an electric field is generated between the electrode and the counter electrode, and the change in distance is measured by a change in capacitance, in this manner, the heating element, which is formed from electrically conducting circuit paths, can also be used as an electrode. In this manner an additional component to form the electrode can also be saved.

Furthermore, it can be an advantage, if the counter electrode is designed as an automobile body component which at least partly adjoins the support element. For example, the support element can be formed by the center console and the counter electrode is formed by the center tunnel on which the center console is disposed. At this point it is an advantage, if the automobile body component comprises a conductive material, e.g. steel or aluminum. In this manner it is possible that no additional component is needed for the counter electrode.

It has proven to be particularly advantageous if an electric field can be generated between the electrode and the counter electrode, and the change in distance is detected by a changing capacitance of the control unit and/or of the sensor element. In this case the electrode and the counter electrode will operate like a capacitor. Since the capacitance of the capacitor changes when the distance between the capacitor plates (between the electrode and the counter electrode) changes, it is then possible, due to the fluctuation in capacitance, to determine the change in distance of the sensor element and/or of the control unit. In this connection, it is an advantage if the control unit is designed to compare the detected sensor signals with a threshold value, so that only after a defined change in capacitance occurs, will the control unit trigger the heating element. In this manner, the heating element can be prevented from switching on, for example when the armrest is merely lightly contacted. Or conversely, that the heating element will switch off when the armrest is merely slightly relieved if the vehicle passenger simply shifts in position, for example.

It can also be an advantage, if the electrode and/or the counter electrode are divided in segments, wherein the control unit is designed to detect in which segment the change in distance occurs. This can be implemented, e.g. in that the sensor element emits different sensor signals to the control unit, depending on which of the segments has changed its distance to the others. At this point, it is likewise an advantage to position one segment of the electrode in an overlapping manner relative to a segment of the counter electrode. The arrangement of segments in this manner can be used, for example, to prevent the heating element from always being switched on by the control unit when a force is applied to the armrest. It can also be useful that the heating element is only switched on when the force is applied solely to a particular segment. In this way, the possibility is obtained that segments can also be used for other control commands. For example, one segment can be used to trigger the heating element and another segment can be used, for instance, to change the height of the armrest, which can be moved electronically, for instance. In this manner, additional control elements can be integrated into the armrest.

In addition, it can be an advantage if the control unit is designed to control the heating element by pulse width modulation (PWM). In this manner, for example, the temperature that the heating element is to attain can be adjusted by the pulse length using the pulse width modulation method.

In this connection, the control unit can be designed to detect the sensor signal in at least one off-phase of the pulse width modulation. In this regard the term "off phase" can be understood to mean a time interval of the pulse width modulation in which the control unit is not sending a pulse to the heating element, thus the voltage of the pulse width modulation has the lowest value, in particular zero. Since the control unit is not sending a signal to the heating element in this off-phase, the same line that is used to send the PWM pulse can also be used to detect the sensor signal. Thus, one electric line can be saved.

The counter electrode can be arranged on one side of the cushion element facing the support element. In this case, the counter electrode can be either directly arranged on the cushion element, or also on the support element, wherein in this case the counter electrode at least contacts the cushion element. Likewise, the counter electrode can be back-sprayed from the support element. In this case, it is an advantage to design the counter electrode as a foil. The counter electrode can be implemented, for example, by a braid of electric conductor paths or a thin, conducting layer.

So that the heat (energy) generated by the heating element can be perceived as quickly as possible by the passenger, it is an advantage that the heating element comprises a plurality of thin, conducting filaments that are woven into the decor layer. In this manner the vehicle passenger can immediately come into direct contact with the heating element when the passenger places a part of the body on the armrest.

Alternatively, the heating element can be printed onto the decor layer. The pressing of the heating element can occur on a side of the decor layer facing or on a side facing away from the cushion element.

In addition, it is an advantage that the control unit is electrically connected to a temperature sensor that detects the temperature of the heating element. Due to the temperature sensor, the control unit can be designed to detect the temperature of the heating element, and to adapt the control of the heating element accordingly. For example, the heat generated by the heating element can thus be limited from exceeding a particular temperature threshold. In this way, the heating element can generate a temperature that is perceived to be pleasant. Furthermore, the temperature sensor can be designed to determine an ambient temperature, for example, the interior temperature of a vehicle interior compartment. For example, the control unit can be designed to compare an ambient temperature value with a desired temperature value so that, for example, the control element will only switch on the heating element when the ambient temperature value exceeds or falls below the desired value and the control unit receives a sensor signal from the sensor element. The ambient temperature value can be detected via the temperature sensor that detects the temperature of the heating element. Alternatively, an additional temperature sensor can be provided.

In addition, the heating element can also comprise a Peltier element. In this way, it is possible for the heating element not only to heat up the armrest, but rather with the appropriate reverse-polarity it is even possible to cool the armrest. In this connection, it is a particular advantage that the control unit is designed to change the polarity of the heating element and/or of the Peltier element, and to switch from the heating mode to a cooling mode. To improve the cooling by the Peltier element, the armrest can comprise a ventilator that can be disposed on the support element, for instance. The cushion element, the support element and/or the decor layer can feature a perforation, wherein the ventilator is arranged in the region of the perforation.

In addition, further advantages and features of the present disclosure will become evident from the following description of various forms. The features described therein and in the text above can be implemented alone or in combination, provided the features are not contradictory.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The figures are merely schematic representations and are provided solely as an explanation of the present disclosure. The same or equivalent elements are numbered throughout with the same reference numerals.

Figure 1:
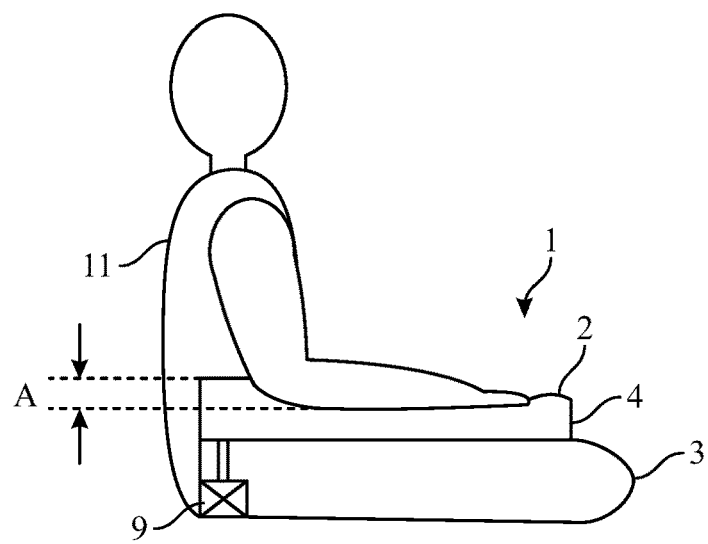
FIG. 1 is a schematic representation of an armrest according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an armrest 1 for a motor vehicle according to the present disclosure, presented in a schematic representation. The armrest 1 comprises a decor layer 2, which in the present exemplary form comprises leather, and a support element 3, which in the present exemplary variation forms a lid of a storage compartment of a center console. A cushion element 4 is arranged between the decor layer 2 and the support element 3 and is formed by a foam body. In addition, a control unit 9 is arranged in the support element and is in contact with a heating element 5 (not depicted in FIG. 1; see FIG. 2) and with an electrode 7 (not depicted in FIG. 1; see FIGS. 2 and 3) and a counter electrode 8 of a sensor element 6. The electrode 7 and the counter electrode 8 extend, like the heating element 5, parallel to the decor layer 2. At least the electrode 7 and the counter electrode 8 overlap in one region in the thickness direction of the armrest 1. A vehicle passenger 11 who places an arm upon the armrest 1, thus changes the distance A of the electrode 7 to the counter electrode 8 in this region, since the cushion element 4 is compressed by the weight of the arm in the thickness direction of the armrest 1. Due to the application of a voltage to the electrode 7 and to the counter electrode 8, which together form the sensor element 6, the control unit 9 generates an electric field at least in the region in which the electrode 7 and the counter electrode 8 overlap, so that a kind of capacitor is produced. Due to the compression and the associated change in distance between the electrode 7 and the counter electrode 8, the capacitance of the formed capacitor changes. This change in capacitance is transmitted from the sensor element 6 to the control unit 9 as a sensor signal. The control unit 9 is designed to switch on the heating element 5 based on this sensor signal. If the arm is removed from the armrest 1, the distance A between the electrode 7 and the counter electrode 8 will increase, which causes a new sensor signal to pass to the control unit 9, which is used by the control unit 9 to switch off the heating element 5. Thus, the heating element 5 will only be switched on when the armrest 1 is subjected to a force.

Figure 2:
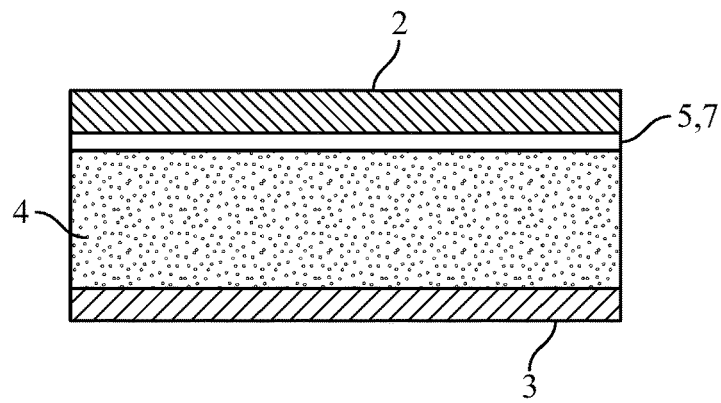
FIG. 2 is a layer structure of an armrest according to the present disclosure, shown in a first form.

FIG. 2 presents a first form of a layer structure of an armrest 1 according to the present disclosure. In this regard, the cushion element 4 is directly adjacent to the support element 3. Furthermore, the heating element is arranged between the cushion element 4 and the decor layer 2. In the present form, the heating element 5 comprises braided electrically conducting circuit paths. The heating element 5 simultaneously forms the electrode 7 of the sensor element 6. The decor layer 2 is arranged on a side of the heating element 5 opposite to the cushion element 4. In the present exemplary form, the counter electrode 8 (not depicted in FIG. 2; see FIG. 3) is formed by a vehicle body component made of electrically conducting material and adjoining the support element 3.

Figure 3:
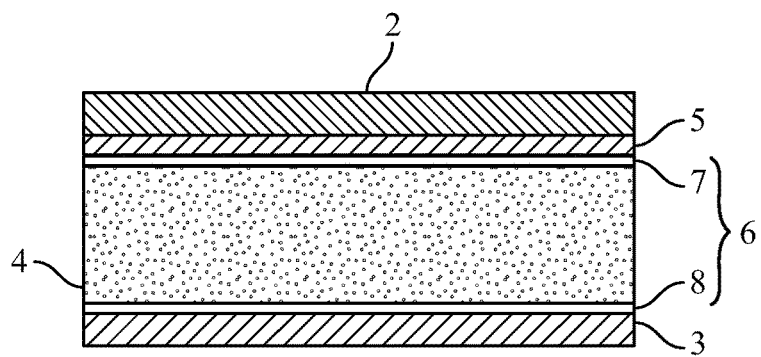
FIG. 3 is a layer structure of an armrest according to the present disclosure, shown in a second form.

FIG. 3 presents an alternative form of a layer structure of an armrest 1 according to the present disclosure. In this regard, the counter electrode 8 is arranged on a side of the cushion element 4 facing the supporting part 3, and the electrode 7 is arranged on a side of the cushion element 4 facing the decor layer 2. Furthermore, the heating element 5 is arranged between the decor layer 2 and the electrode 7. The electrode 7 and the counter electrode 8 are arranged on the cushion element 4. Furthermore, the heating element 5 is arranged between the decor layer 2 and the electrode 7. The electrode 7 and the counter electrode 8 together form the sensor element 6.

Figure 4A:
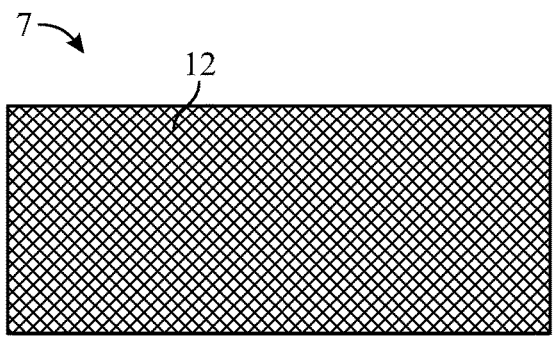
FIG. 4A is a schematic view of one form of an electrode having a braid of circuit paths according to the present disclosure.
Figure 4B:
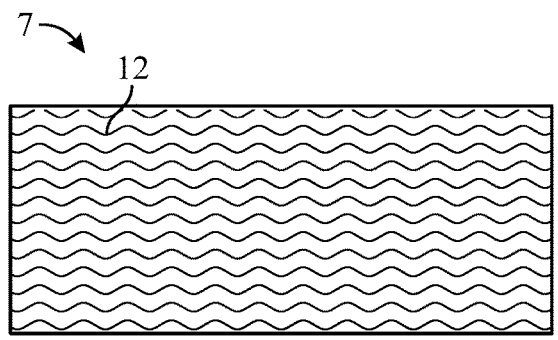
FIG. 4B is a schematic view of another form of an electrode having a meander-like circuit path according to the present disclosure.

FIGS. 4A and 4B depict forms of an electrode 7 according to the present disclosure. According to form 4A, the electrode 7 is formed by a braid of circuit paths 12. The circuit paths can comprise of copper wires or metallized textile filaments, for example. But FIG. 4B depicts a form of an electrode 7 in which slender or meander-like circuit paths 12 are woven into a textile. In the present exemplary form, the textile comprises a synthetic non-woven fabric, wherein the circuit paths 12 are formed from thin copper wires.

Figure 5A:
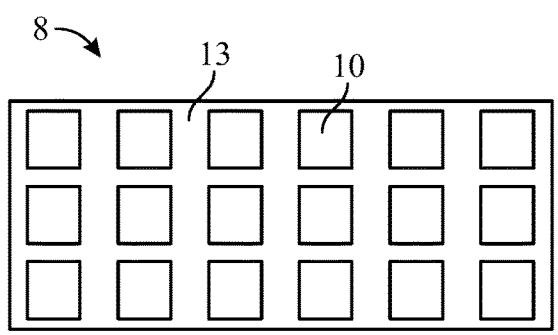
FIG. 5A is a schematic view of one form of a counter electrode in which conductive segments are incorporated according to the present disclosure.
Figure 5B:
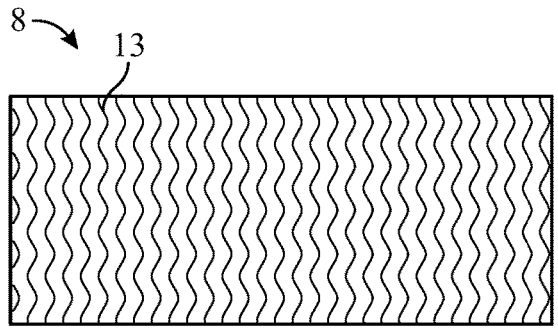
FIG. 5B is a schematic view of another form of a counter electrode in which electrically conducting circuit paths are incorporated serpentine-like into a woven textile according to the present disclosure.

FIGS. 5A and 5B depict forms of a counter electrode 8 according to the present disclosure, shown in a schematic representation. FIG. 5A depicts a counter electrode 8 into which conductive segments 10 are incorporated. Each segment 10, individually and independently of the other segments 10, can generate a capacitive field with respect to the electrode 7 (not depicted in FIGS. 5A and 5B). Likewise, each segment 10 can output a sensor signal to the control unit 9 (not depicted in FIGS. 5A and 5B) independently of the other segments 10. In one form, the segments 10 are formed from small copper plates that are adhered to a layer of a non-woven fabric 15. FIG. 5B depicts an alternative form of the counter electrode 8 in which electrically conducting circuit paths 13 are incorporated serpentine-like into a woven textile.

The explanations provided with reference to the figures are of a purely exemplary nature and shall in no way be interpreted as a waiver.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An armrest for an interior equipment part of a motor vehicle, the armrest comprising:
    a decor layer;
    a support element;
    a cushion element disposed at least in sections between the support element and the decor layer;
    a heating element disposed at least in sections on the decor layer; and
    a sensor element comprising an electrode and a counter electrode and electrically connected to a control unit,
    wherein the electrode is arranged in an overlapping manner, at least in sections, on a side of the cushion element facing the decor layer at a distance to the counter electrode arranged in a region of the support element, and
    the sensor element is configured to send an electric sensor signal to the control unit when the distance between the electrode and the counter electrode changes at least in regions, and the control unit is configured to detect the sensor signal in at least one off-phase of a pulse width modulation, and switch the heating element on and/or off as a function of the sensor signal.

2. The armrest according to claim 1, wherein the heating element comprises the electrode of the sensor element.

3. The armrest according to claim 1, wherein the counter electrode is formed by a vehicle body component that at least in part adjoins the support element.

4. The armrest according to claim 1, wherein an electric field is generated between the electrode and the counter electrode, and the changes in the distance are detected by a changing capacitance of the control unit.

5. The armrest according to claim 1, wherein at least one of the electrode and the counter electrode are divided in segments, wherein the control unit is configured to detect in which segment a change in the distance occurs.

6. The armrest according to claim 1, wherein the control unit is configured to control the heating element by the pulse width modulation.

7. The armrest according to claim 1, wherein the counter electrode is arranged on one side of the cushion element facing the support element.

8. The armrest according to claim 1, wherein the heating element is woven into the decor layer.

9. The armrest according to claim 1, wherein the heating element is printed onto the decor layer.

10. The armrest according to claim 1, wherein the control unit is electrically connected to a temperature sensor that detects temperature of the heating element.

11. The armrest according to claim 1, wherein the control unit is electrically connected to a temperature sensor that is configured to determine an ambient temperature value.

12. The armrest according to claim 1, wherein the heating element is a Peltier element.

13. The armrest according to claim 1, wherein the cushion element comprises a foam body.

* * * * *